US008149843B2

(12) United States Patent
Oswal et al.

(10) Patent No.: US 8,149,843 B2
(45) Date of Patent: Apr. 3, 2012

(54) CAPABILITY EXCHANGE BETWEEN NETWORK ENTITIES IN WIMAX

(75) Inventors: Anand K. Oswal, Sunnyvale, CA (US); Jayaraman Iyer, Sunnyvale, CA (US); Bhaskar Bhupalam, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 917 days.

(21) Appl. No.: 11/477,747

(22) Filed: Jun. 28, 2006

(65) Prior Publication Data
US 2008/0002637 A1    Jan. 3, 2008

(51) Int. Cl.
*H04L 12/28* (2006.01)
*G06F 15/173* (2006.01)

(52) U.S. Cl. .................. 370/395.21; 370/331; 370/328; 370/312

(58) Field of Classification Search .................. 455/419, 455/574, 556.2; 370/331
See application file for complete search history.

(56) References Cited

U.S. PATENT DOCUMENTS

| 2004/0116117 | A1  | 6/2004  | Ahvonen et al. |
| 2005/0048961 | A1  | 3/2005  | Ribaudo et al. |
| 2005/0266879 | A1* | 12/2005 | Spaur et al. ................ 455/556.2 |
| 2005/0272481 | A1* | 12/2005 | Kim ............................... 455/574 |
| 2006/0274694 | A1* | 12/2006 | Rajkumar et al. ............ 370/331 |
| 2007/0064673 | A1* | 3/2007  | Bhandaru et al. ............ 370/351 |
| 2007/0207794 | A1* | 9/2007  | Dunko ........................... 455/419 |
| 2007/0230393 | A1* | 10/2007 | Sinha et al. ................... 370/328 |
| 2009/0135758 | A1* | 5/2009  | Alper et al. ................... 370/328 |
| 2009/0213810 | A1* | 8/2009  | Shousterman et al. ....... 370/331 |

FOREIGN PATENT DOCUMENTS

| CN | 101480029 | 7/2009 |
| EP | 2033425 | 3/2009 |
| WO | WO 2008002603 | 1/2008 |

OTHER PUBLICATIONS

Welzl, Michael, "Quality of Service Provisioning in WiMAX Networks: Chances and Challenges", Distributed and Parallel Systems Group, Institute of Computer Science, University of Innsbruck, Austria, http://www.welzl.at.

(Continued)

*Primary Examiner* — Rafael Pérez-Gutiérrez
*Assistant Examiner* — Frank Donado
(74) *Attorney, Agent, or Firm* — Patent Capital Group (57) ABSTRACT

Techniques for exchanging capabilities in a wireless network are provided. In one embodiment, a first device receives a capability message over a communication link from a second device in a WiMAX network. The communication link may be between any combination of base stations and gateways. For example, the R4, R6, or R8 interface may be used. Other interfaces may also be appreciated in a WiMAX network. The capability message includes one or more capabilities supported by a second device in the WiMAX network. Capabilities to support are then determined based on the one or more capabilities. These capabilities will be supported by the first device for communications with the second device. The first device is then configured to support the determined capabilities. Accordingly, the first device is dynamically configured based on the capability message received.

17 Claims, 5 Drawing Sheets

OTHER PUBLICATIONS

Notification Concerning Transmittal of the International Preliminary Report on Patentability (1 page) mailed Jan. 15, 2009, International Preliminary Report on Patentability (1 page) dated Jan. 6, 2009, and Written Opinion of the International Searching Authority (4 pages) mailed Feb. 4, 2008 for International Application No. PCT/US07/14898.

Notification of Transmittal of the International Search Report and the Written Opinion of the International Searching Authority (1 page), International Search Report (2 pages), and Written Opinion of the International Searching Authority (4 pages) for International Application No. PCT/US07/14898 mailed Feb. 4, 2008.

* cited by examiner

CAPABILITY EXCHANGE BETWEEN NETWORK ENTITIES IN WIMAX

BACKGROUND OF THE INVENTION

Embodiments of the present invention generally relate to wireless networks and more specifically to techniques for exchanging capabilities in a wireless network for dynamic configuration.

In a worldwide interoperability for microwave access (WiMAX) network, base stations and gateways may communicate. For example, a base station may communicate with a gateway using a protocol running over an R6 reference point. Also, gateways may communicate with each other using a protocol running over an R4 reference point. The base stations and gateways may be built by different vendors. In WiMAX, a number of features may be optional and may not be implemented by all the vendors. Also, as networks change, new equipment may be added. Because equipment by the different vendors may support different features, the base stations and gateways need to be configured to know which features the other base stations and gateways support to allow communications between them.

Each base station and gateway may be manually configured for each device it will be communicating with. Accordingly, each base station and gateway is statically configured when it is set up in the network. The manual configuration of each base station and gateway is time-consuming and burdensome, also it does not scale as the network grows. This is magnified by the number of base stations and gateways that are required to communicate with each other in the WiMAX network.

DETAILED DESCRIPTION OF EMBODIMENTS OF THE INVENTION

Embodiments of the present invention provide techniques for exchanging capabilities in a wireless network. A first device receives a capability message over a communication link from a second device in a WiMAX network. The communication link may be between any combination of base stations and gateways. In WiMAX, communications between devices are defined by interfaces or reference points. For example, when a base station and gateway communicate, a protocol over an R6 interface is used. When a gateway and another gateway communicate, protocol over an R4 interface is used. Also, when a base station and base station communication, an R8 reference point is used. Other reference points may also be appreciated in a WiMAX network.

The capability message includes one or more capabilities supported by a second device in the WiMAX network. Capabilities to support are then determined based on the one or more capabilities. These capabilities will be supported by the first device for communications with the second device. The first device is then configured to support the determined capabilities. Accordingly, the first device is dynamically configured based on the capability message received. The second device may also be dynamically configured with the determined capabilities.

Figure 1:
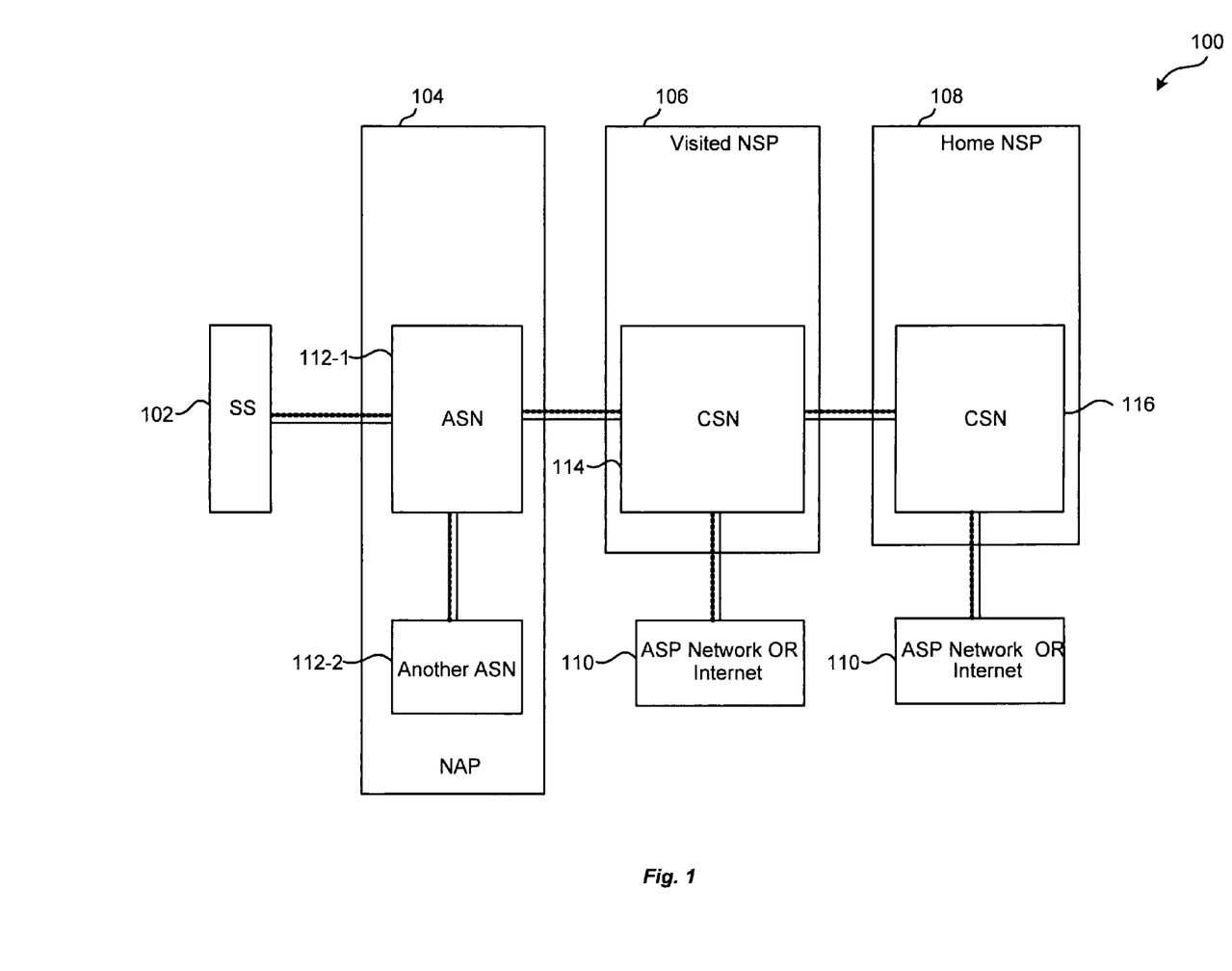
FIG. 1 shows a system depicting an example of a network according to one embodiment of the present invention.

FIG. 1 shows a system 100 depicts an example of a network according to one embodiment of the present invention. In one embodiment, system 100 includes a worldwide interoperability for microwave access (WiMAX) network. Although WiMAX may be described, it will be recognized that other wireless access networks may be appreciated in addition to other wire line networks and protocols.

System 100 includes a subscriber station 102, network access provider (NAP) domain 104, a visited network service provider (NSP) domain 106, a home NSP domain 108, and application service provider (ASP) network 110. Although this system is described, it will be recognized that variations of system 100 will be appreciated.

Subscriber stations 102 may be mobile devices or substantially stationary devices. For example, subscriber station 102 may include a laptop computer, cellular phone, personal digital assistant (PDA), Blackberry device, soft phone, set-top box, personal computers, etc. Also, subscriber stations 102 may communicate through a wireless network, wire line network, or a combination of both.

NAP domain 104 includes access service networks 112. ASN 112 connects an access device through a base station to a service provider network. An access service network is a network that connects users to telecommunication service providers. It can be considered the route to the subscriber's home network or any other service provider network. For example, ASN 112 connects to a connectivity service network (CSN) 114 of visited NSP domain 106 or a CSN 116 of home NSP domain 108.

Subscriber station 102 may connect to different ASNs 112 as it roams through NAP domain 104. For example, subscriber station 102 may move from ASN 112-1 to ASN 112-2. This may occur as a user roams with subscriber station 102 to different locations. When this occurs, ASN 112-1 may hand off the service to ASN 112-2.

CSN 116 is a network associated with a home network. For example, subscriber station 102 may be associated with a home address in a home network. This is the base network for subscriber station 102 and may be operated by a service provider. When the access device roams to other networks operated by different NSPs, then the access device accesses CSN 114 through visited NSP domain 106.

Subscriber station 102 may access the Internet or other ASP networks 110 through CSN 114 and CSN 116. CSN 114 and CSN 116 are networks that provide the connectivity to the Internet, etc. Services may then be provided through ASP networks 110 and the Internet.

Figure 2:
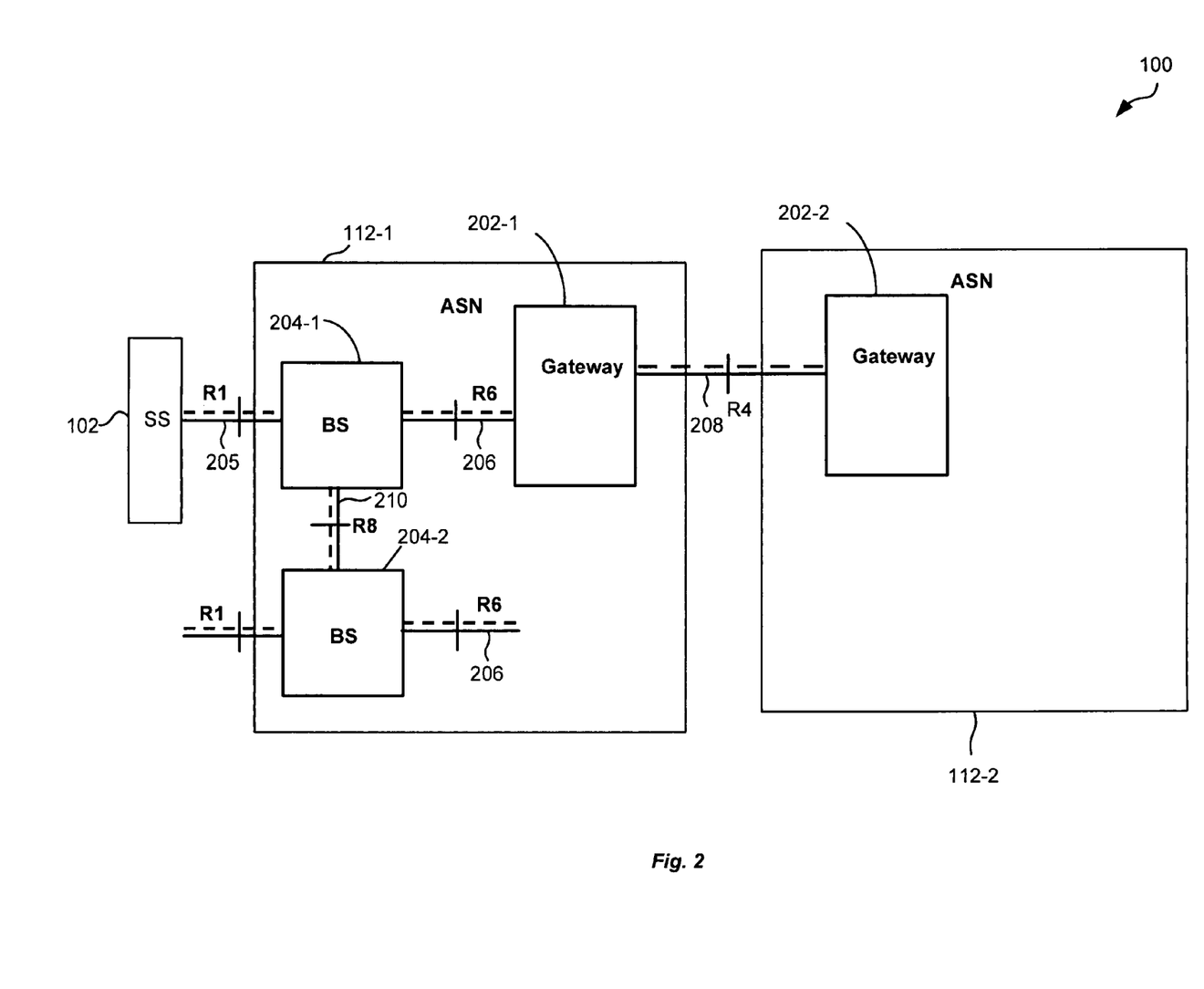
FIG. 2 depicts a more detailed embodiment of the system according to embodiments of the present invention.

FIG. 2 depicts a more detailed embodiment of system 100 according to embodiments of the present invention. As shown, ASN 112 includes a gateway 202 and multiple base stations 204.

Base stations 204 provide an access point to ASN 112. In one embodiment, a link 205 may be a wireless link. Link 205 may use wireless protocols and procedures, such as those defined in WiMAX. Other protocols may also be appreciated, such as 802.11x, and further enhancements to the 802.16 protocol and its successors will also be appreciated. Communications over link 205 may be sent using the R1 reference point. A reference point may be a logical interface. In this case the R1 reference point is between base station 204 and gateway 202.

Gateway 202 may be a network device that is found in ASN 112. Gateway 202 is configured to communicate with home NSP 108 and/or visited NSP 106. Communications from subscriber station 102 may flow through base station 204 to gateway 202. A link 206 between base station 204 and gateway 202 may be a wireless or wire line link. Communications over link 206 may be sent using a protocol over the R6 interface as defined in the WiMAX Forum. The R6 interface is between base station 204 and gateway 202.

Gateway 202-1 communicates with gateway 202-2 over a link 208. Link 208 may be wireless or wire line link. Communications over link 206 may be sent using a protocol over the R4 interface as defined in the WiMAX Forum. The R4 interface is between gateways 202.

Base stations 202-1 communicates with gateway 202-2 over a link 208. Link 208 may be wireless or wire line link. Communications over link 206 may be sent using a protocol over the R4 interface as defined in the WiMAX Forum. The R4 interface is between gateways 202.

Embodiments of the present invention allow communications over links 206, 208, and/or 210 using an extension to protocols running over the R4, R6, and/or R8 interfaces where capabilities for base station 204-1 or gateways 202 may be exchanged. When the R4, R6, and/or R8 interface is determined, it is meant to be any interface that is used over the link between gateways/base stations. Although the above interfaces are described, it will be understood that other interfaces may be used to exchange capabilities between devices. For example, the R1 interface may be used to exchange capabilities between subscriber station 102 and base station 202. In fact, any interface as defined in WiMAX may be used to exchange capabilities between devices.

Base station 204-1 and gateway 202-1 may communicate over link 206 to negotiate which capabilities are supported. Base station 204-1 and gateway 202-1 may then dynamically configure themselves based on the capabilities supported.

Gateway 202-1 can also communicate with gateway 202-2 over link 208 to negotiate which capabilities to support. Once the capabilities to support are determined for communications, gateway 202-1 and gateway 202-2 dynamically configure themselves to use those capabilities in communications between each other.

Base station 204-1 and base station 204-2 may communicate over link 210 to negotiate which capabilities are supported. Base station 204-1 and base station 204-2 may then dynamically configure themselves based on the capabilities supported.

Figure 3:
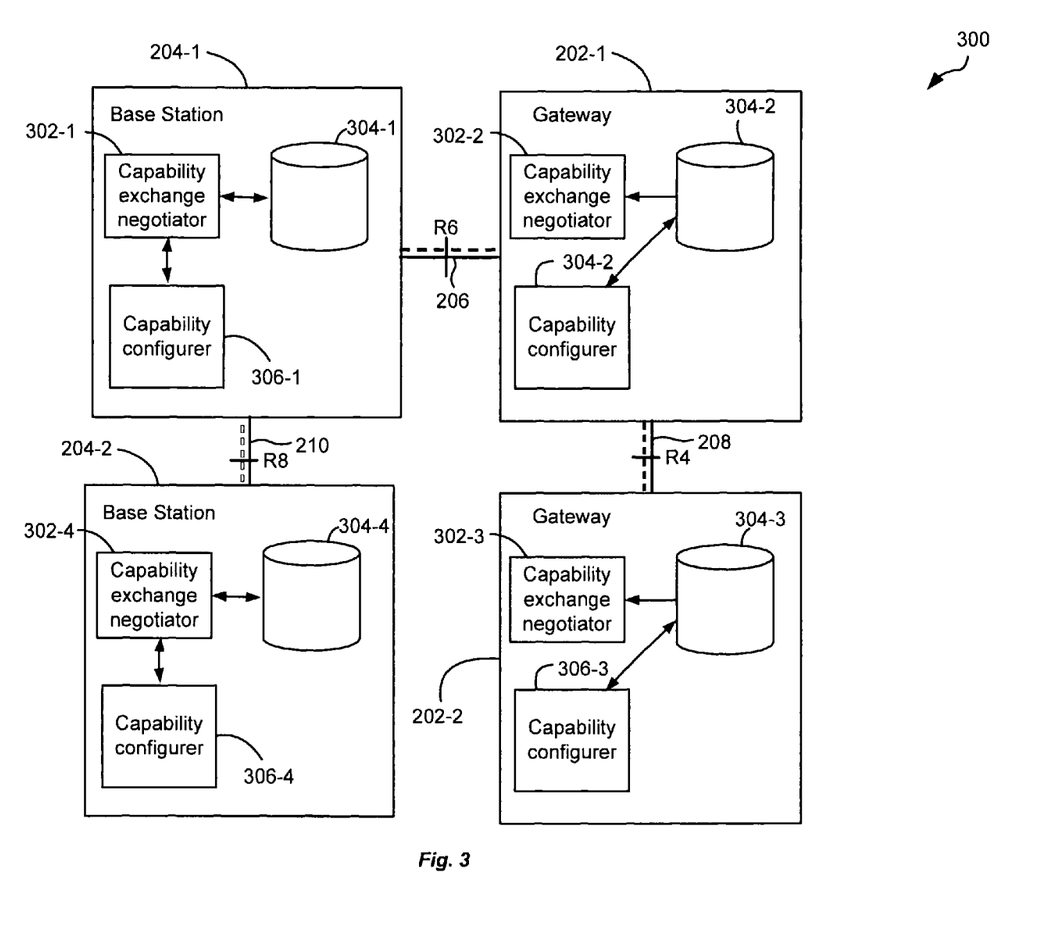
FIG. 3 depicts a more detailed embodiment of a base station and gateways according to embodiments of the present invention.

FIG. 3 depicts a more detailed embodiment of base station 204-1, base station 204-2, gateway 202-1, and gateway 202-2 according to embodiments of the present invention. As shown, base station 204-1, base station 204-2, gateway 202-1, and gateway 202-2 include a capability exchange negotiator 302, a database 304, and a capability configurer 306.

Capability exchange negotiator 302 is configured to negotiate which capabilities should be supported for communications. In one embodiment, capability exchange negotiator 302-1 may generate a capability message that includes the capabilities supported by base station 204-1. The message is then sent using the R6 protocol to gateway 202-1. Capability exchange negotiator 302-1 may determine which capabilities are supported by base station 204-1 by looking up the capabilities supported in database 304-1.

Capability exchange negotiator 302-2 receives the capability message. Capability exchange negotiator 302-2 can then determine which capabilities to support for communications with base station 204-1. In one embodiment, capability exchange negotiator 302-2 may select one or more capabilities found in the message. For example, if the message includes a certain tunneling type that is supported by gateway 202-1, then gateway 202-1 may choose to support that tunneling type.

In another embodiment, capability exchange negotiator 302-2 may engage in a negotiation with capability exchange negotiator 302-1. In this case, capability exchange negotiator 302-2 may generate a second capability message. For example, the capabilities supported by gateway 202-1 are retrieved from database 304-2 and a second capability message is generated. The second capability message is sent over link 206 using the R6 interface. Capability exchange negotiator 302-1 and capability exchange negotiator 302-2 may then exchange any number of messages to determine which capabilities to support for communications between them. Other methods of negotiation will also be appreciated.

Once the capability to support is determined, capability configurer 304-1 and capability configurer 304-2 configure base station 204-1 and gateway 202-1, respectively. This is done dynamically and thus alleviates a requirement for statically configuring base station 204-1 and gateway 202-1. Although one capability is described, it will be understood that any number of capabilities to support may be determined and configured.

The configuration may be for all communications between base station 204-1 and gateway 202-1. Also, the configuration may be on a per session basis. For example, for a certain session, a first set of capabilities are used and, for another session, a second set of capabilities are used. In one example, a first QoS may be configured for a first session and a second QOS may be configured for a second session.

The above negotiation to determine capability support may also be performed between gateway 202-1 and gateway 202-2. The exception is the negotiation may be performed over link 208 using the R4 interface. Also, the above negotiation to determine capability support may also be performed between base station 204-1 and base station 204-2. The exception is the negotiation may be performed over link 210 using the R8 interface.

Figure 4:
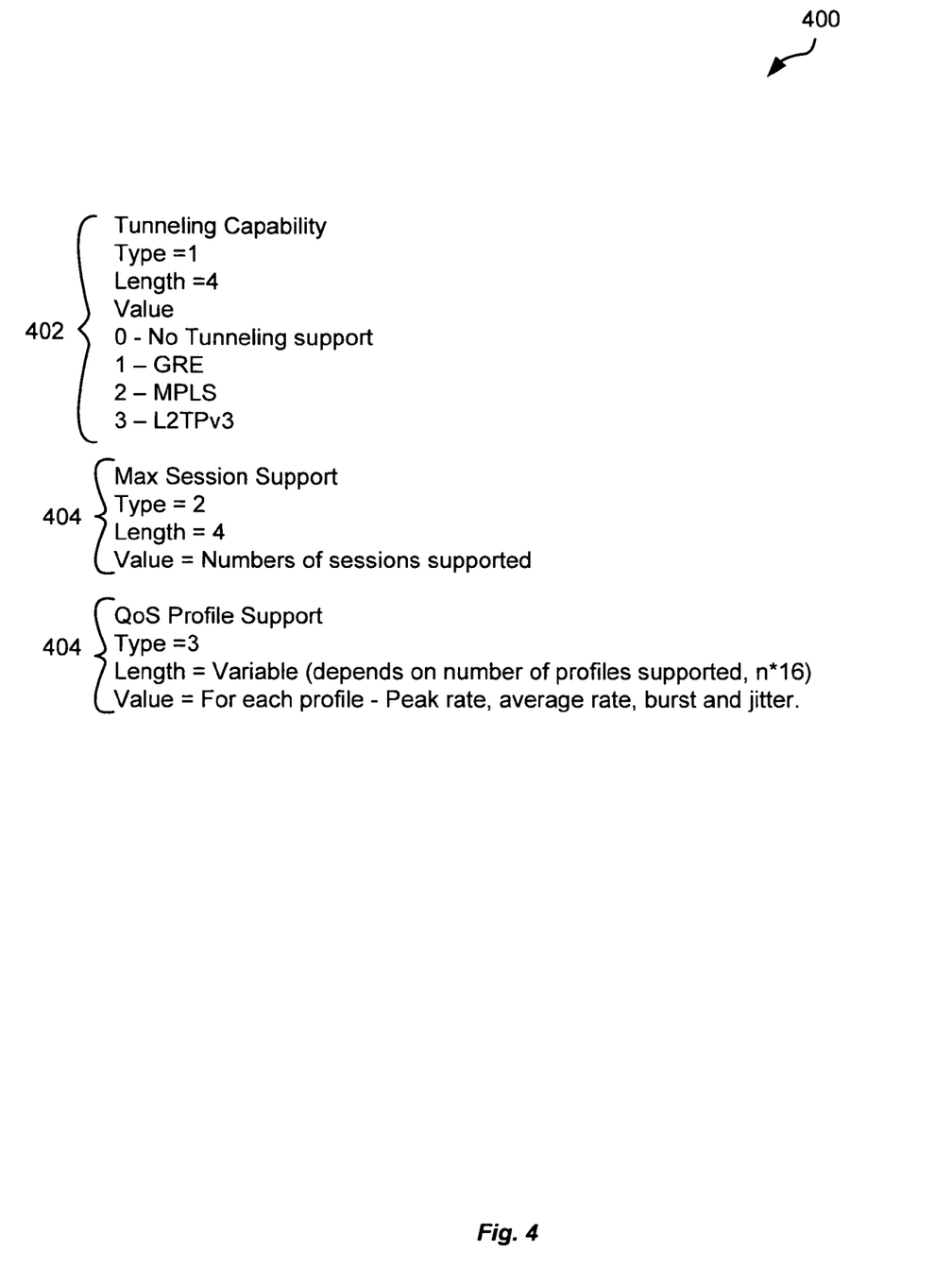
FIG. 4 depicts an example capability message according to one embodiment of the present invention.

FIG. 4 depicts an example capability message according to one embodiment of the present invention. In one embodiment, the capability message may be a type/length/value (TLV) message. The type may be numeric code that indicates the kind of type field that this part of the message represents, the length may be size of the value field, and the value field may be a variable size set of bytes that contains data for this part of the message. Although the TLV format is described, it will be recognized, that other formats may be provided.

The TLV message may be included in a packet that is sent. As shown, a type field 402 may be a 16-bit field that is set to a to-be-determined amount. The type field may indicate different capabilities.

A length field 404 may be a 16-bit field that indicates the length of the value portion in octets and may be a multiple of 4 octets dependent on the number of capabilities advertised.

A value field may be the variable length sequence of capability bits rounded to a multiple of 4 octets. The value may include a number of sub-TLVs.

As shown, the TLV message includes a first TLV 402. In TLV 402, the type equals 1, which indicates that the capability is a tunneling capability. The length equals 4, which indicates the length may be 4 octets.

The possible values that could be included in a value field are a value 0, which equals no tunneling support; the value 1, which equals generic routing encapsulation (GRE); the value 2, which equals multi-protocol label switching (MPLS); and the value 3, which equals a layer-to-tunneling protocol v3 (L2TPv3). These are different tunneling capabilities that could be supported. In one embodiment, one or more of the values may be inserted TLV 402 depending on which tunneling capabilities are supported.

A second TLV is a TLV 404. In TLV 404, the type equals 2, which indicates capability support for a maximum number of sessions. The length is 4 and the value may indicate the number of sessions that are supported.

In a TLV 406, the type is 3, which indicates which QoS is supported. The length is variable and depends on the number of profiles supported. For the value for each profile, the peak rate, average rate, burst, and jitter may be included. Each of the values may be 4 bytes.

In one example, gateway 202-1 may determine that a tunneling type of GRE may be used, a QOS profile can be supported, and a maximum number of sessions can be supported form the TLVs. This is configured and communications with base station 204-1 then use these capabilities.

It will be recognized that the above is only an example of TLVs that may be included in a capability message and other TLVs may be appreciated.

Figure 5:
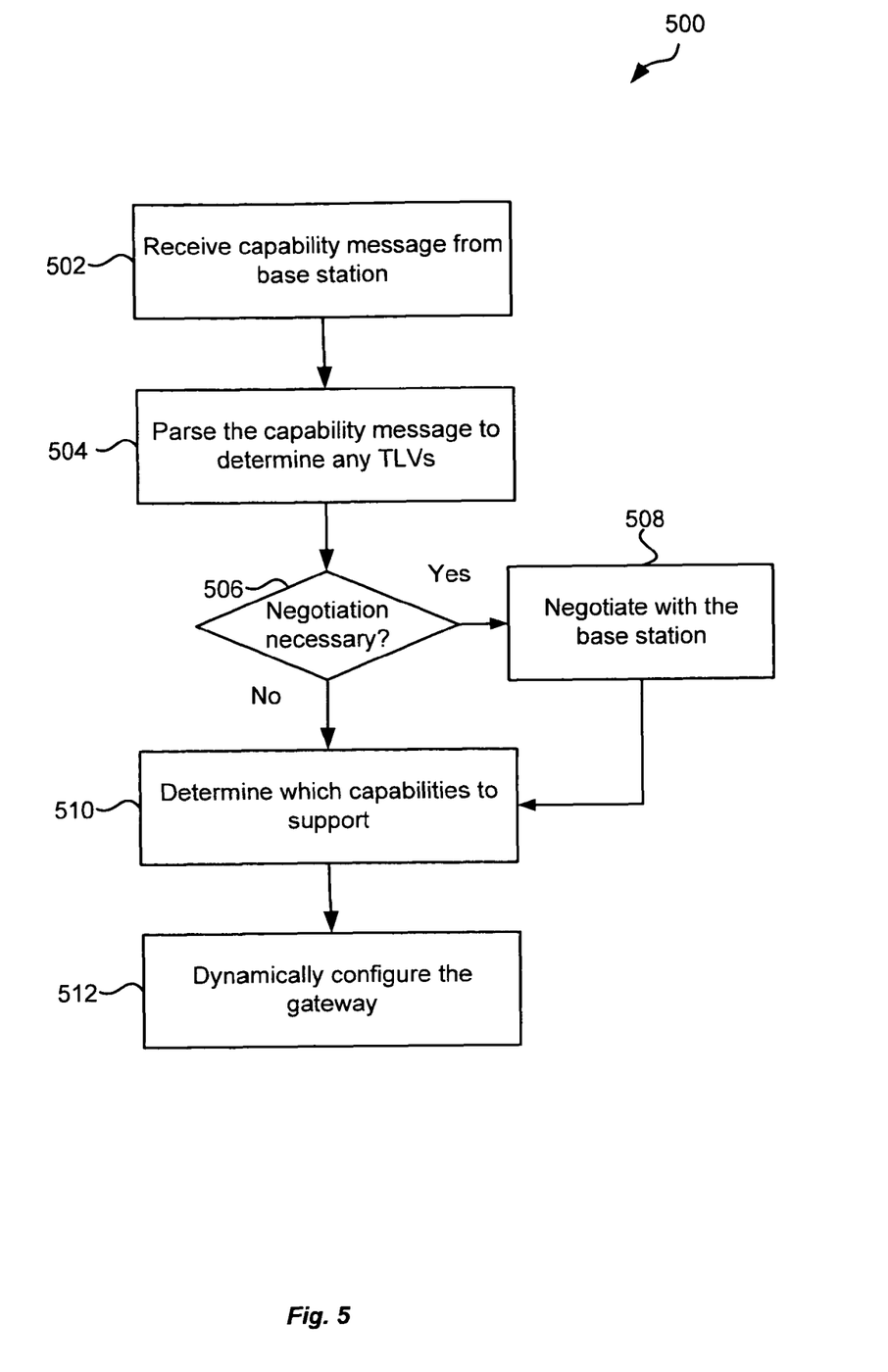
FIG. 5 depicts a simplified flowchart for a method of negotiating capability support according to one embodiment of the present invention.

FIG. 5 depicts a simplified flowchart 500 for a method of negotiating capability support according to one embodiment of the present invention. The negotiation is assumed to be between base station 204-1 and gateway 202-1; however, it will be understood that the negotiation may be between gateway 202-1 and gateway 202-2, or base station 204-1 and base station 204-2.

In step 502, a capability message is received at gateway 202-1 from base station 204-1. Step 504 parses the capability message to determine any TLVs in the message.

Step 506 determines if a negotiation is necessary to determine which capability support is needed for communications. If a negotiation is necessary, in step 508, gateway 202-1 sends a second capability message with one or more TLVs indicating which capabilities are supported to base station 204-1. Gateway 202-1 and base station 204-1 may continue to send messages between each other during the negotiation.

Step 510 determines which capability to support for communications. This may be based on the negotiation or gateway 202-1 may just select one of the capabilities sent in the capability message received in step 502.

Step 512 then dynamically configures gateway 202-1 and base station 204-1 to support the capability determined for communications with base station 204-1.

Accordingly, base station 204-1 and gateway 202-2 may determine each other's capability dynamically. The negotiation may be performed to determine which capabilities to configure for communications. Accordingly, base stations 204 and gateways 202 may learn the max sessions supported, tunneling capabilities, and QoS support for each other, and dynamically configure themselves to support the capabilities.

The dynamic configuration alleviates manual configuration. This may be useful when devices are added or changed in a network. When devices register with each other, the capability exchange may occur and the network devices may be dynamically configured.

Although base stations 204 and gateways 204 are described, it will be understood that other network devices, such as gateway support nodes (GGSN), packet data serving nodes (PDSN), or point coordinated function (PCF) devices may be used in embodiments of the present invention. Further, although WiMAX is described, it will be understood that other wireless protocols may be used in embodiments of the present invention.

Although the invention has been described with respect to specific embodiments thereof, these embodiments are merely illustrative, and not restrictive of the invention. Although WiMAX is described, it will be understood that other wireless protocols may be used to exchange capabilities. Also, other interfaces in WiMAX can be used and different devices may exchange capabilities.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an" and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method, comprising:
    sending, over a first communication link using a first interface in a worldwide interoperability for microwave access (WiMAX) service network, a first capability message from a base station to a first device, wherein the first capability message is a type length value (TLV) message comprising a first set of capabilities of the base station, wherein the first set of capabilities includes a quality of service (QoS), a maximum number of sessions, and a tunneling type to be used;
    receiving, over the first communication link using the first interface, a second capability message from the first device to the base station, wherein the second capability message is a TLV message comprising a second set of capabilities of the first device, wherein the second set of capabilities is a first subset of the first set of capabilities;
    sending, over a second communication link using a second interface, a third capability message from the base station to a second device, wherein the third capability message is a TLV message comprising the first set of capabilities of the base station;
    receiving, over the second communication link using the second interface, a fourth capability message from the second device to the base station, wherein the fourth capability message is a TLV message comprising a third set of capabilities of the second device, wherein the third set of capabilities is a second subset of the first set of capabilities;
    configuring the base station to support the second set of capabilities for communications with the first device; and
    configuring the base station to support the third set of capabilities for communications with the second device.

2. The method of claim 1, wherein:
    the first interface comprises an R6 interface;
    the second interface comprises an R6 interface;
    the first device comprises a first gateway; and
    the second device comprises a second gateway.

3. The method of claim 1, wherein:
    the first interface comprises an R6 interface;
    the second interface comprises an R8 interface;
    the first device comprises a gateway; and
    the second device comprises a second base station.

4. The method of claim 1, wherein:
    the first device is configured to support the second set of capabilities for communications with the base station; and
    the second device is configured to support the third set of capabilities for communications with the base station.

5. The method of claim 1, wherein the configuring the base station to support the second set of capabilities is in a first session, and the method further comprises:
sending, over the first communication link using the first interface, a fifth capability message from the base station to the first device in a second session, wherein the fifth capability message is a TLV message comprising a fourth set of capabilities of the base station, wherein the fourth set of capabilities includes another quality of service (QoS);
receiving, over the first communication link using the first interface, a sixth capability message from the first device to the base station, wherein the sixth capability message is a TLV message comprising a fifth set of capabilities of the first device, wherein the fifth set of capabilities is a third subset of the fourth set of capabilities; and
configuring the base station to support the fifth set of capabilities for communications with the first device in the second session.

6. The method of claim 1, wherein the WiMAX service network comprises an application service provider network configured to provide access to a subscriber station.

7. The method of claim 6, wherein the application service provider network connects the subscriber station to a telecommunication service provider network.

8. An apparatus comprising:
a processor;
a capability configuring element; and
a capability exchange negotiator, wherein the apparatus is configured for:
sending, over a first communication link using a first interface in a worldwide interoperability for microwave access (WiMAX) service network, a first capability message from a base station to a first device, wherein the first capability message is a type length value (TLV) message comprising a first set of capabilities of the base station, wherein the first set of capabilities includes a quality of service (QoS), a maximum number of sessions, and a tunneling type to be used;
receiving, over the first communication link using the first interface, a second capability message from the first device to the base station, wherein the second capability message is a TLV message comprising a second set of capabilities of the first device, wherein the second set of capabilities is a first subset of the first set of capabilities;
sending, over a second communication link using a second interface, a third capability message from the base station to a second device, wherein the third capability message is a TLV message comprising the first set of capabilities of the base station;
receiving, over the second communication link using the second interface, a fourth capability message from the second device to the base station, wherein the fourth capability message is a TLV message comprising a third set of capabilities of the second device, wherein the third set of capabilities is a second subset of the first set of capabilities;
configuring the base station to support the second set of capabilities for communications with the first device; and
configuring the base station to support the third set of capabilities for communications with the second device.

9. The apparatus of claim 8, wherein:
the first interface comprises an R6 interface;
the second interface comprises an R6 interface;
the first device comprises a first gateway; and
the second device comprises a second gateway.

10. The apparatus of claim 8, wherein:
the first interface comprises an R6 interface;
the second interface comprises an R8 interface;
the first device comprises a gateway; and
the second device comprises a second base station.

11. The apparatus of claim 8, wherein:
the first device is configured to support the second set of capabilities for communications with the base station; and
the second device is configured to support the third set of capabilities for communications with the base station.

12. The apparatus of claim 8, wherein the configuring the base station to support the second set of capabilities is in a first session, and the apparatus is further configured for:
sending, over the first communication link using the first interface, a fifth capability message from the base station to the first device in a second session, wherein the fifth capability message is a TLV message comprising a fourth set of capabilities of the base station, wherein the fourth set of capabilities includes another quality of service (QoS);
receiving, over the first communication link using the first interface, a sixth capability message from the first device to the base station, wherein the sixth capability message is a TLV message comprising a fifth set of capabilities of the first device, wherein the fifth set of capabilities is a third subset of the fourth set of capabilities; and
configuring the base station to support the fifth set of capabilities for communications with the first device in the second session.

13. Logic encoded in non-transitory media that includes code for execution and when executed by a processor, is operable to perform operations, comprising:
sending, over a first communication link using a first interface in a worldwide interoperability for microwave access (WiMAX) service network, a first capability message from a base station to a first device, wherein the first capability message is a type length value (TLV) message comprising a first set of capabilities of the base station, wherein the first set of capabilities includes a quality of service (QoS), a maximum number of sessions, and a tunneling type to be used;
receiving, over the first communication link using the first interface, a second capability message from the first device to the base station, wherein the second capability message is a TLV message comprising a second set of capabilities of the first device, wherein the second set of capabilities is a first subset of the first set of capabilities;
sending, over a second communication link using a second interface, a third capability message from the base station to a second device, wherein the third capability message is a TLV message comprising the first set of capabilities of the base station;
receiving, over the second communication link using the second interface, a fourth capability message from the second device to the base station, wherein the fourth capability message is a TLV message comprising a third set of capabilities of the second device, wherein the third set of capabilities is a second subset of the first set of capabilities;

configuring the base station to support the second set of capabilities for communications with the first device; and configuring the base station to support the third set of capabilities for communications with the second device.

14. The logic of claim 13, wherein:
the first interface comprises an R6 interface;
the second interface comprises an R6 interface;
the first device comprises a first gateway; and
the second device comprises a second gateway.

15. The logic of claim 13, wherein:
the first interface comprises an R6 interface;
the second interface comprises an R8 interface;
the first device comprises a gateway; and
the second device comprises a second base station.

16. The logic of claim 13, wherein:
the first device is configured to support the second set of capabilities for communications with the base station; and
the second device is configured to support the third set of capabilities for communications with the base station.

17. The logic of claim 13, wherein the configuring the base station to support the second set of capabilities is in a first session, and the operations further comprise:

sending, over the first communication link using the first interface, a fifth capability message from the base station to the first device in a second session, wherein the fifth capability message is a TLV message comprising a fourth set of capabilities of the base station, wherein the fourth set of capabilities includes another quality of service (QoS);

receiving, over the first communication link using the first interface, a sixth capability message from the first device to the base station, wherein the sixth capability message is a TLV message comprising a fifth set of capabilities of the first device, wherein the fifth set of capabilities is a third subset of the fourth set of capabilities; and configuring the base station to support the fifth set of capabilities for communications with the first device in the second session.

* * * * *